US012766806B2

(12) United States Patent
Brendlinger

(10) Patent No.: US 12,766,806 B2
(45) Date of Patent: Oct. 20, 2026

(54) FOLDABLE CORRUGATED PAPERBOARD CORNER PIECE

(71) Applicant: John Brendlinger, Santa Fe Springs, CA (US)

(72) Inventor: John Brendlinger, Santa Fe Springs, CA (US)

( * ) Notice: Subject to any disclaimer, the term of this patent is extended or adjusted under 35 U.S.C. 154(b) by 9 days.

(21) Appl. No.: 19/233,814

(22) Filed: Jun. 10, 2025

(65) Prior Publication Data

US 2025/0304319 A1 Oct. 2, 2025

Related U.S. Application Data

(62) Division of application No. 18/673,688, filed on May 24, 2024.

(60) Provisional application No. 63/504,398, filed on May 25, 2023.

(51) Int. Cl.
*B31B 50/26* (2017.01)
*B31B 120/00* (2017.01)

(52) U.S. Cl.
CPC ........ *B31B 50/26* (2017.08); *B31B 2120/502* (2017.08); *B65D 2519/00542* (2013.01)

(58) Field of Classification Search
CPC .............. B31B 50/26; B31B 2120/502; B65D 2519/00542; B65D 5/5033; B65D 2581/053; B65D 5/002; B65D 5/0025; B65D 5/0045; B65D 5/0065; B65D 81/053; B65D 81/054; B65D 19/20
See application file for complete search history.

(56) References Cited

U.S. PATENT DOCUMENTS

| | | | | |
|---|---|---|---|---|
| 1,449,374 A * | 3/1923 | Bonfield | B65D 5/446 | |
| | | | 206/320 | |
| 2,160,221 A | 5/1939 | Masters | | |
| 4,771,893 A * | 9/1988 | Liebel | B65D 81/054 | |
| | | | 206/326 | |
| 2005/0121357 A1 | 6/2005 | Robinson | | |

FOREIGN PATENT DOCUMENTS

| | | | |
|---|---|---|---|
| GB | 1058168 | 2/1967 | |
| GB | 1058168 A * | 2/1967 | B65D 81/054 |
| KR | 101423943 B1 * | 8/2014 | B65D 81/053 |

OTHER PUBLICATIONS

International Preliminary Report on Patentability from PCT/US2024/030971, published Jul. 16, 2025.

* cited by examiner

*Primary Examiner* — Matthew W Ing
(74) *Attorney, Agent, or Firm* — Concourse Law Group; Katherine B. Sales, Esq.

(57) ABSTRACT

A corrugated paperboard corner shroud comprising a first side and a second side, and a flap extending from one of the sides of the shroud to form a first wall panel of a box. Each side having an outer layer, a middle layer, and an inner layer, wherein the first side and the second side are foldably coupled together along one side, and the middle layers are fastened to their respective inner and outer layers. A blank for forming a corner shroud, the blank comprising a flat, rectangular piece of corrugated paperboard and having a first, second, third and fourth edge, an inner surface having at least four adhesive sections thereon, an outer surface, and a first series of scorelines extending along the blank from the first edge to the second edge. A method of making the corner shroud. A box having the corner shroud.

6 Claims, 15 Drawing Sheets

FOLDABLE CORRUGATED PAPERBOARD CORNER PIECE

CROSS-REFERENCE TO RELATED APPLICATIONS

This United States Non-Provisional patent application is a divisional application of U.S. Non-Provisional patent application Ser. No. 18/673,688, titled "Foldable Corrugated Paperboard Corner Piece," filed May 24, 2024, which claims priority to U.S. Provisional Patent Application Ser. No. 63/504,398, titled "Foldable Corrugated Paperboard Corner Piece," filed May 25, 2023, the contents of which are incorporated by reference herein in their entirety.

TECHNICAL FIELD

This invention relates to boxes and packaging material to protect items for transportation and storage.

BACKGROUND

Currently within the corrugated industry, corner boards, edge protectors or V boards are used when wrapping display pallets as well as product pallets to protect the contents during shipping and to provide support for stacking pallets on top of each other. Corner boards are widely used by most industrial companies and high-volume retailers. They are cost effective and significantly enhance the stability of pallet loads. It is very common to use corner boards in conjunction with corrugated shrouds to wrap the loads. However, corner boards have a down side with respect to their disposal once the load arrives at its destination.

Unlike corrugated boxes and displays, corner boards cannot be broken down. Corner boards are made with recycled paper and glue pressed into a right angle. There are many layers to build up the rigid board. The high percentage of glue with the already recycled paper create a board that is no longer recyclable. They can be reused if in good condition, but the lengths may not be suitable for the next use. So, reusing corner boards is very limited, and the corner boards end up going to the landfill.

A major retailer is putting forth a mandate to eliminate the use of corner boards. This is specifically due to the lack of recyclability. It is expected that other major retailers will follow suit and there will be a need to use other methods for protecting and stabilizing the loads.

One option is to increase the strength of the individual containers that hold product. This would not be a popular option because the increased strength will increase cost, which would only benefit the shipping aspect, and be far beyond the singular requirements of containing and/or displaying the product.

Another option is to increase the strength and layers of shrouds and caps. Again, this would only add expense just to facilitate shipping, only to be thrown away upon arrival.

For the foregoing reasons there is a need for improved corner boards that provide the needed stability, while having the recyclability of corrugated boxes.

SUMMARY

The present invention satisfies this need. In a first embodiment, the present invention is directed to a corrugated paperboard corner shroud comprising a first side and a second side. Each side has an outer layer, a middle layer, and an inner layer, wherein the first side and the second side are foldably coupled together along one side, and the middle layers are fastened to their respective inner and outer layers.

Optionally, the corner shroud has a first flap extending from one of the sides of the shroud to form a first wall panel of a box.

Optionally, the corner shroud has a second flap extending from the other side of the shroud to form a second wall panel of the box.

In a second embodiment, the present invention is directed to a box having at least one corner shroud.

In a third embodiment, the present invention is directed to a box having at least one corner shroud and wall panel.

In a fourth embodiment, the present invention is directed to a blank for forming a corner shroud. The blank comprises a flat, rectangular piece of corrugated paperboard and has first edge, a second edge, a third edge, a fourth edge, an inner surface having at least four adhesive sections thereon, an outer surface, and a first series of scorelines extending along the blank from the first edge to the second edge, wherein the scorelines are spaced apart from each other by a distance in the direction of the third edge and the fourth edge, the first series of scorelines comprising a first scoreline, a second scoreline, a third scoreline, a fourth scoreline, and a fifth scoreline.

Optionally, at least four of the five first series of scorelines each comprise a pair of parallel scorelines.

Optionally, the blank has a second series of scorelines extending along the blank from the first edge to the second edge, wherein the second series of scorelines is proximate the third edge of the blank.

Optionally, the blank has a first flap disposed between the first series of scorelines and the second series of scorelines.

Optionally, the blank has a second flap disposed between the first series of scorelines and the fourth edge.

Optionally, the outer surface of the blank further comprises at least three adhesive sections thereon.

In a fifth embodiment, the present invention is directed to a first method of folding the blank. The method comprises the steps of a) providing the blank and placing the blank inner surface facing up; b) folding the blank inward along the first scoreline and placing the third edge proximate the third scoreline; c) folding the blank inward along the fifth scoreline and placing the fourth edge proximate the fourth scoreline; d) folding the blank inward along the second scoreline and placing the first scoreline proximate the third scoreline, forming a first side of the corner shroud; e) folding the blank inward along the fourth scoreline and placing the fifth scoreline proximate the third scoreline, forming a second side of the corner shroud; and f) folding the first side along the third scoreline towards the second side, such that the first side and second side form a corner.

Optionally, step c) is performed before step b).

Optionally, step e) is performed before step d).

In a sixth embodiment, the present invention is directed to a second method of folding the blank. The second method comprises the steps of: a) providing the blank and placing the blank inner surface facing up; b) folding the blank inward along the second scoreline and placing the first scoreline proximate the third scoreline; c) folding the blank outward along the first scoreline such that the third edge extends away from the third scoreline, forming a first side of a first corner shroud; d) folding the blank inward along the fourth scoreline and placing the fifth scoreline proximate the third scoreline; e) folding the blank outward along the fifth scoreline such that the fourth edge extends away from the third scoreline, opposite the third edge, forming a second side of the first corner shroud; f) folding the blank along the third scoreline to form the first corner shroud; g) folding the blank inward along the sixth scoreline and placing the third edge proximate the seventh scoreline, forming a first side of a second corner shroud; h) folding the blank inward along the eighth scoreline and placing the ninth scoreline proximate the seventh scoreline; i) folding the blank outward along the ninth scoreline such that the first flap extends away from the third edge, forming a second side of the second corner shroud; and j) folding the blank along the seventh scoreline to form the second corner shroud.

Optionally, steps d) and e) are performed before steps b) and c).

Optionally, steps g) through j) are performed before steps b) through f).

BRIEF DESCRIPTION OF DRAWINGS

These and other features, aspects, and advantages of the present invention will become better understood with regard to the following description, appended claims, and accompanying drawings.

DETAILED DESCRIPTION OF THE INVENTION

As used herein, the following terms and variations thereof have the meanings given below, unless a different meaning is clearly intended by the context in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Figure 1:
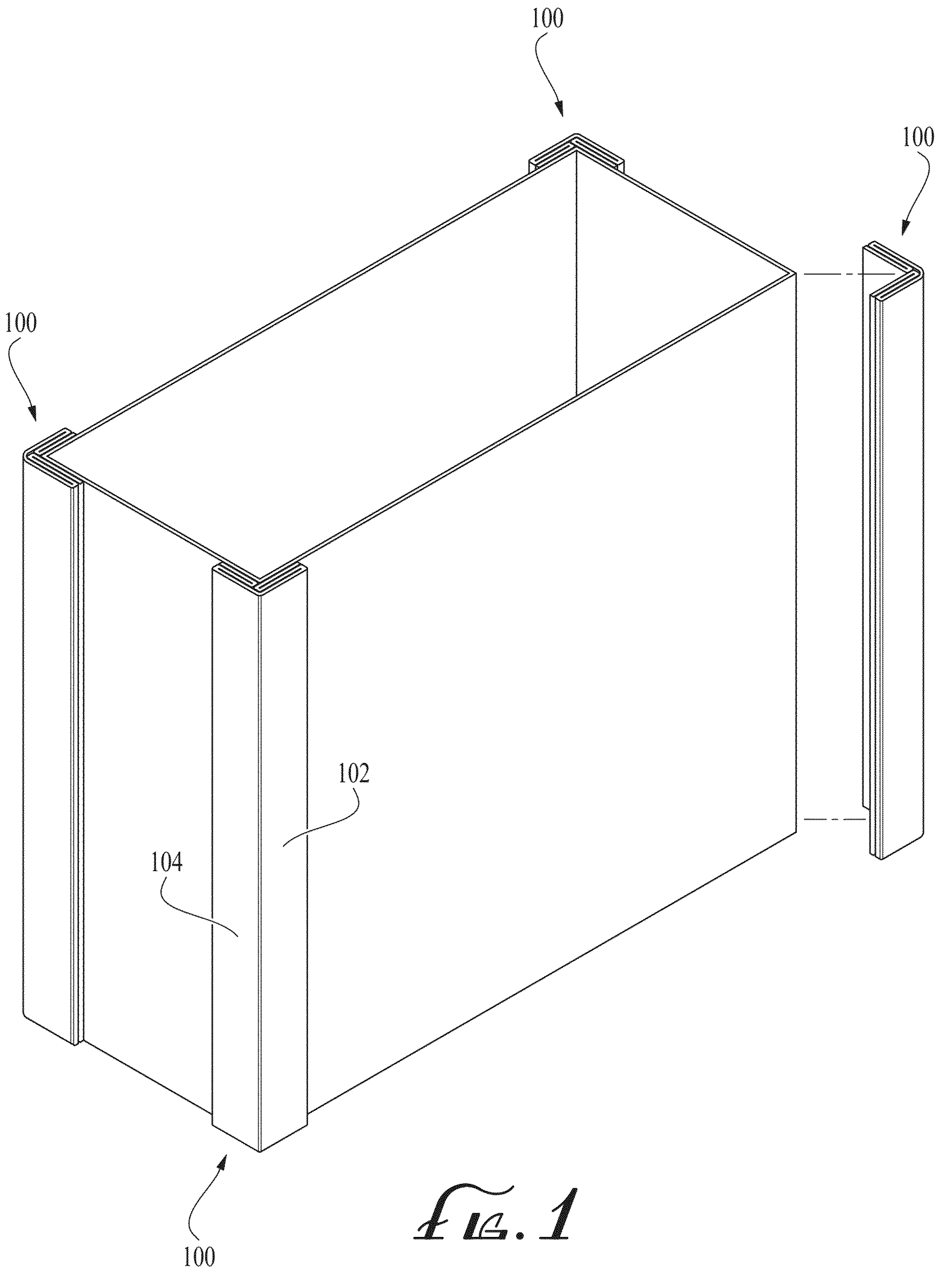
FIG. 1 is a perspective view of a corner shroud having features of the present invention, wherein the corner shroud is applied to an outside corner of a box.
Figure 2:
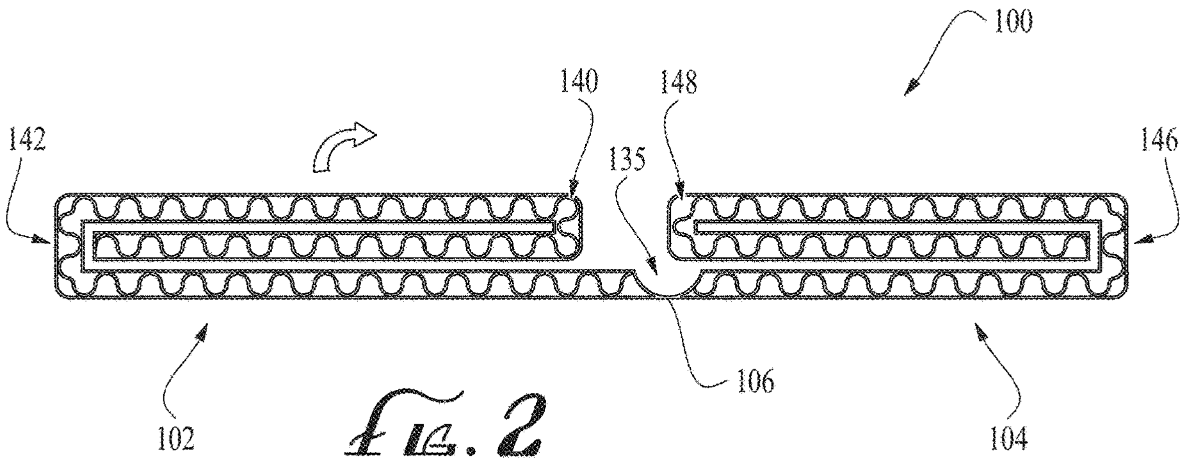
FIG. 2 is a top plan view of a blank used to form the corner shroud of FIG. 1.
Figure 3:
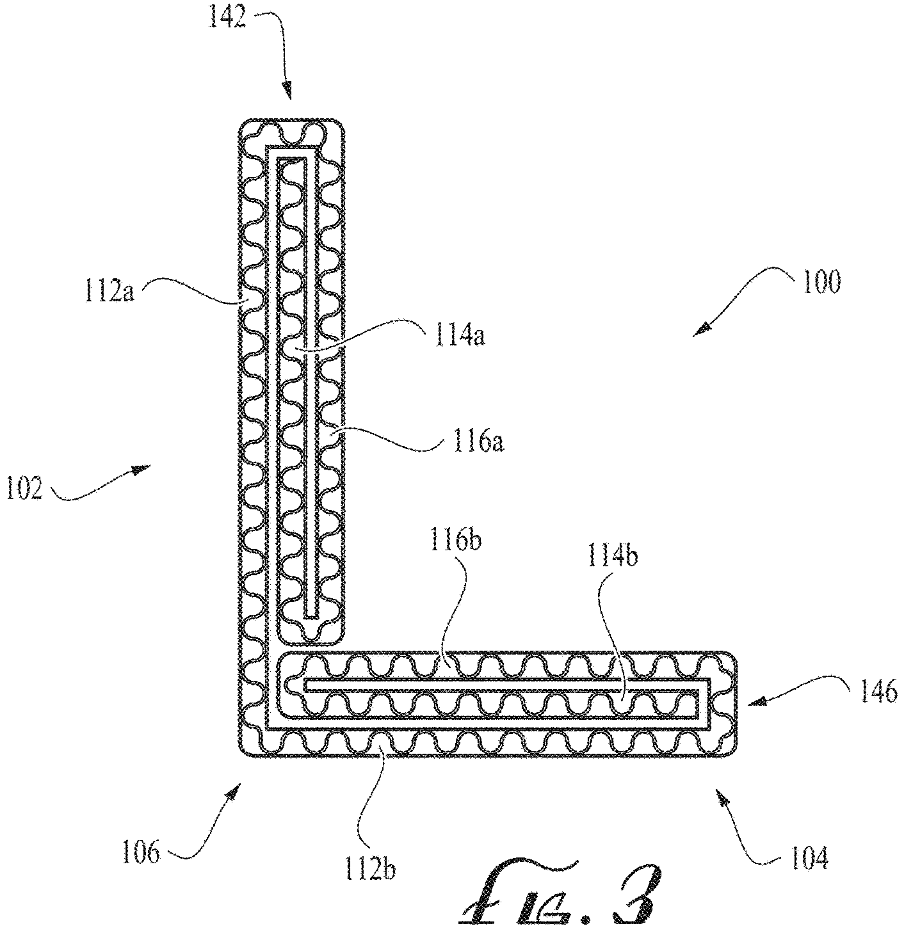
FIG. 3 is a perspective view of a first step of folding the blank of FIG. 2.

Referring now to FIGS. 1 through 3, there is shown a first embodiment of the present invention, which is directed towards a corner shroud 100 and a method of manufacturing the corner shroud 100. The corner shroud 100 is a three-layer corner piece comprising a first side 102, which is made up of three layers, joined together with a second side 104, which is made up of three layers. The first side 102 and second side 104 are operatively connected together at a corner line 106. At the corner line 106, the first side 102 and the second side 104 are bent towards each other to form the corner shroud 100. This is best seen in FIG. 2. In a preferred version of the first embodiment, the corner shroud 100 is a single, integral piece. Therefore, although multiple pieces can be used, in the preferred first embodiment, the corner shroud 100 is made from a single blank 110 (as shown in FIGS. 4 through 8) that is folded in a specific manner as described below.

Referring now to FIGS. 2 and 3, the first side 102 comprises three layers: an outer layer **112*a*, a middle layer 114*a* adjacent to the outer layer 112*a*, and an inner layer 116*a* adjacent to the middle layer 114*a* opposite the outer layer 112*a*. The second side 104 also comprises three layers: an outer layer 112*b*, a middle layer 114*b* adjacent to the outer layer 112*b*, and in inner layer 116*b* adjacent to the middle layer 114*b* opposite the outer layer 112*b*. In the preferred embodiment, the middle layers 114*a*, 114*b* are fastened to their respective outer layers 112*a*, 112*b*, and to their respective inner layers 116*a*, 116*b*. Preferably, the outer layer of the first side 112*a* and the outer layer of the second side 112*b* are foldably coupled together along one side at corner line 106. The first side middle layer 114*a* is foldably connected to the first side inner layer 116*a* forming a first side internal corner and the second side middle layer 114*b* is foldably connected to the second side inner layer 116*b* forming a second side internal corner. The first side internal corner and the second side internal corner are proximate each other and the second side internal corner is proximate an internal surface of the outer layer 112***a*, 112*b*.

In some embodiments, the inner layers 116*a*, 116*b* can remain unfastened as loose flaps. In some embodiments, the middle layers 114*a*, 114*b* are not fastened to their respective outer layers 112*a*, 112*b*. In embodiments in which the layers are fastened, fastening can be done with typical fasteners in the industry, such as glue, tape, staples, and the like 115.

Referring now to FIGS. 4 through 8, there is shown the blank 110 that is folded in a specific manner to form the corner shroud 100. The blank 110 is a flat, rectangular piece of material. Preferably, the material is corrugated paperboard, but other material can also be used. The blank 110 has a first edge 130, a second edge 132 opposite the first edge 130, a third edge 134 adjacent to the first edge 130 and the second edge 132, and a fourth edge 136 opposite the third edge 134 and adjacent to the first edge 130 and the second edge 132, an outer surface 156 bound by the four edges, and an inner surface 154 opposite the outer surface and bound by the four edges. A plurality of scorelines can be created in the blank 110 in the direction of the first edge 130 to the second edge 132 to facilitate the folding steps for manufacturing the corner shroud 100.

In the first embodiment, the blank 110 comprises a series of five scorelines each extending in the direction of the first edge 130 and the second edge 132. Preferably, the scorelines extend the full length of the blank 110 from the first edge 130 to the second edge 132. The scorelines run parallel to each other and are spaced apart from each other by a distance in the direction of the third edge 134 and fourth edge 136. For ease of description, the following ordinal numbers are used to one scoreline from another, but the ordinal numbers are not limiting. The first scoreline 140 is the scoreline closest to the third edge 134. The second scoreline 142 is the scoreline immediately adjacent to the first scoreline 140 moving in the direction of the fourth edge 136. The third scoreline 144 is the scoreline immediately adjacent to the second scoreline 142 continuing to move in the direction of the fourth edge 136. The fourth scoreline 146 is the scoreline immediately adjacent to the third scoreline 144 continuing to move in the direction of the fourth edge 136. The fifth scoreline 148 is the scoreline immediately adjacent to the fourth scoreline 146 continuing to move in the direction of the fourth edge 136. With this configuration, the third scoreline 144 is the middle scoreline, and when properly folded becomes the corner line 106 of the corner shroud 100.

Figure 4:
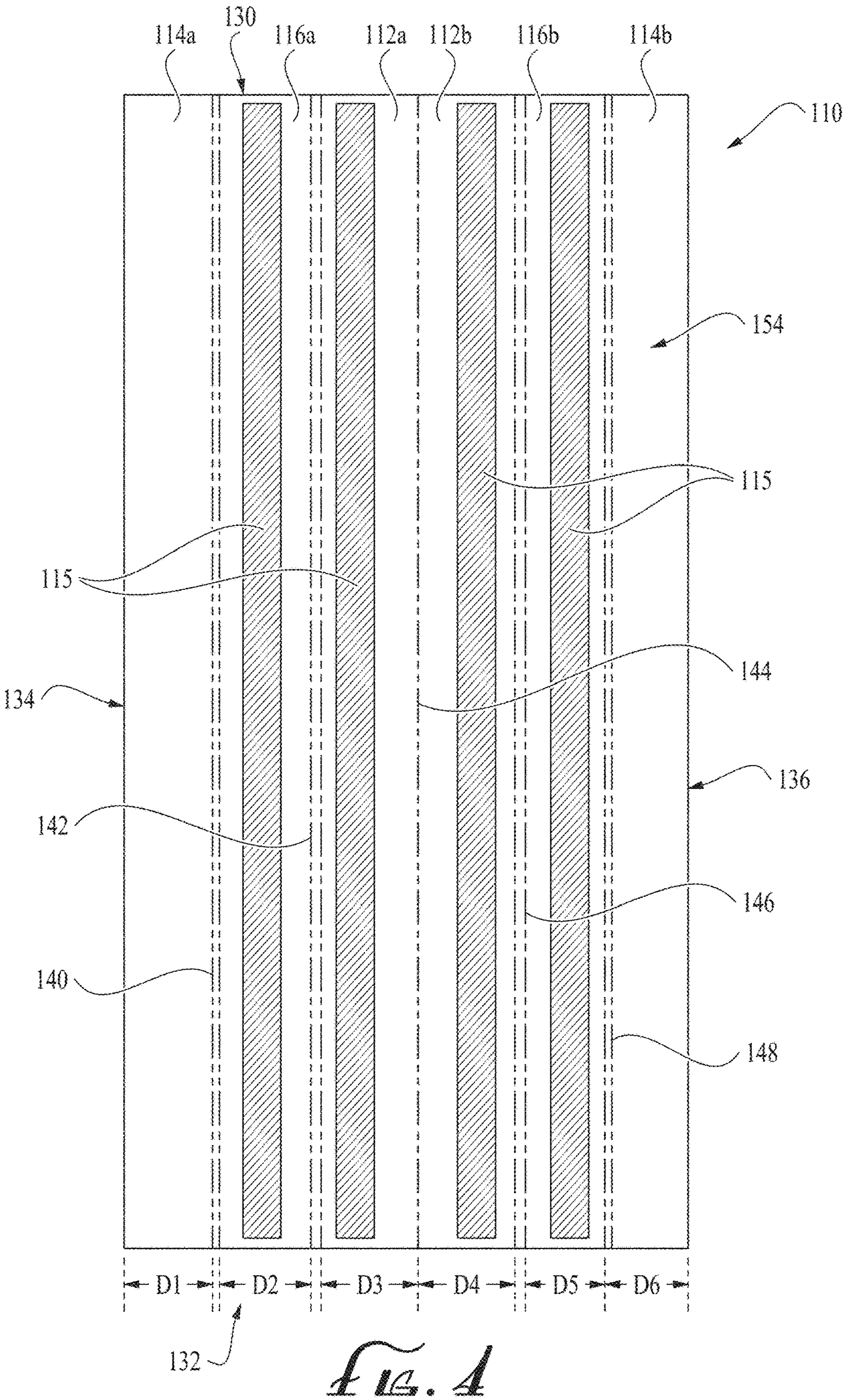
FIG. 4 is a perspective view of a second step of folding the blank of FIG. 2.
Figure 5:
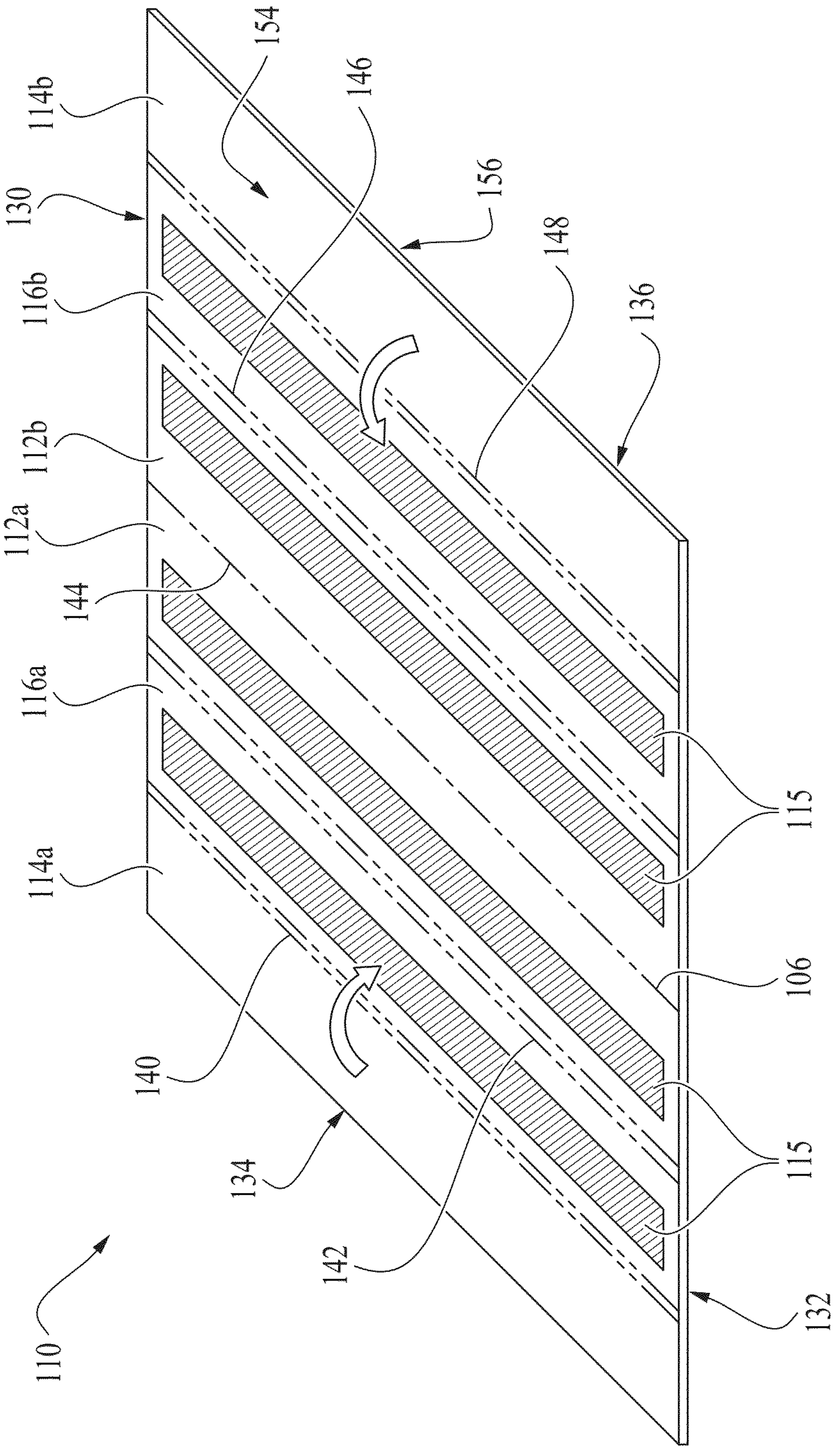
FIG. 5 is a perspective view of a third step of folding the blank of FIG. 2.

Optionally, as shown in FIG. 4, the first, second, fourth and fifth scorelines 140, 142, 146, 148 each comprise a pair of parallel scorelines to form a more gradual bend in the blank 110 when folded. Optionally, the third scorelines 144 comprises a pair of scorelines.

In the first embodiment, the first distance D1 between the third edge 134 and the first scoreline 140 is less than the second distance D2 between the first score line 140 and the second scoreline 142. In addition, the second distance D2 is less than the third distance D3 between the second scoreline 142 and the third scoreline 144. The third distance D3 can be equal to the fourth distance D4 between the third scoreline 144 and the fourth scoreline 146. Also, the fifth distance D5 between the fourth scoreline 146 and the fifth scoreline 148 is greater than the sixth distance D6 between the fifth scoreline 148 and the fourth edge 136. In some embodiments, all six distances D1-D6 can be equal to each other.

Figure 6:
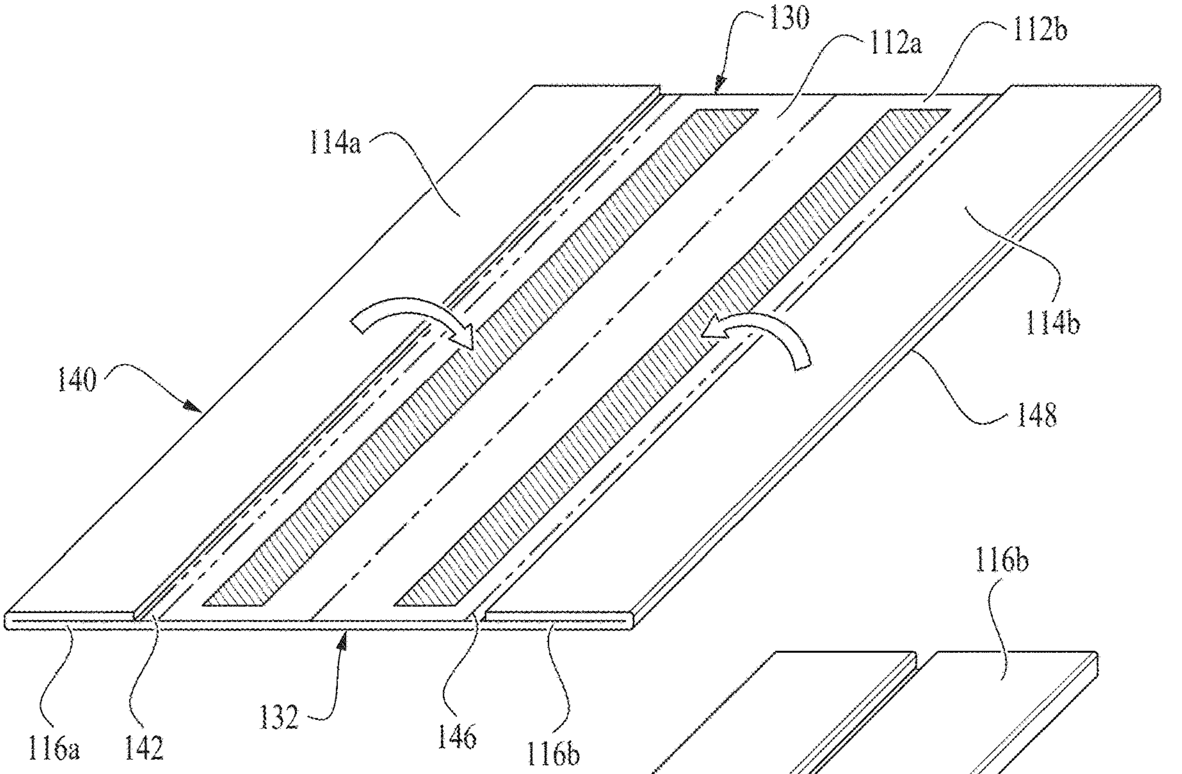
FIG. 6 is a perspective view of the folded blank of FIG. 2, wherein the shroud of FIG. 1 has been formed.

To form the corner shroud 100 from the blank 110, the following steps are taken without being limited by any sequence of steps. If the blank 110 is laid on the ground the inner surface 154 can be faced up and the outer surface 156 can be placed on the ground. The blank 110 is folded inward at the first scoreline 140, causing the third edge 134 to move towards the second scoreline 142. This folding causes the third edge 134 to be in line with (or on top of) the second scoreline 142. Additionally, the blank 110 is folded inward at the fifth scoreline 148, causing the fourth edge 136 to move towards the fourth scoreline 146. This folding causes the fourth edge 136 to be in line with (or on top of) the fourth scoreline 146. This is best seen in FIG. 6. At this time, the inner surfaces of middle layers 114*a*, 114*b* can be secured to the inner surfaces of inner layers 116*a*, 116*b* for example, with adhesive or other fastener 115.

Figure 7:
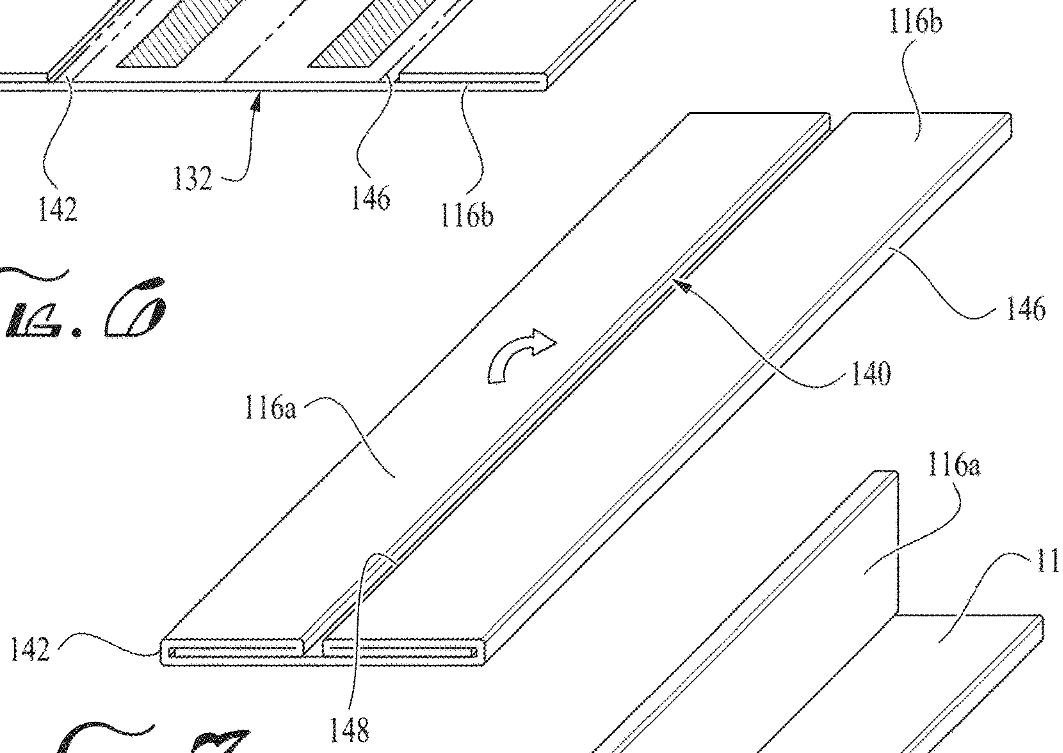
FIG. 7 is a close-up view of an end portion of the partially folded blank of FIG. 5, wherein the final folding step is shown in greater detail.
Figure 8:
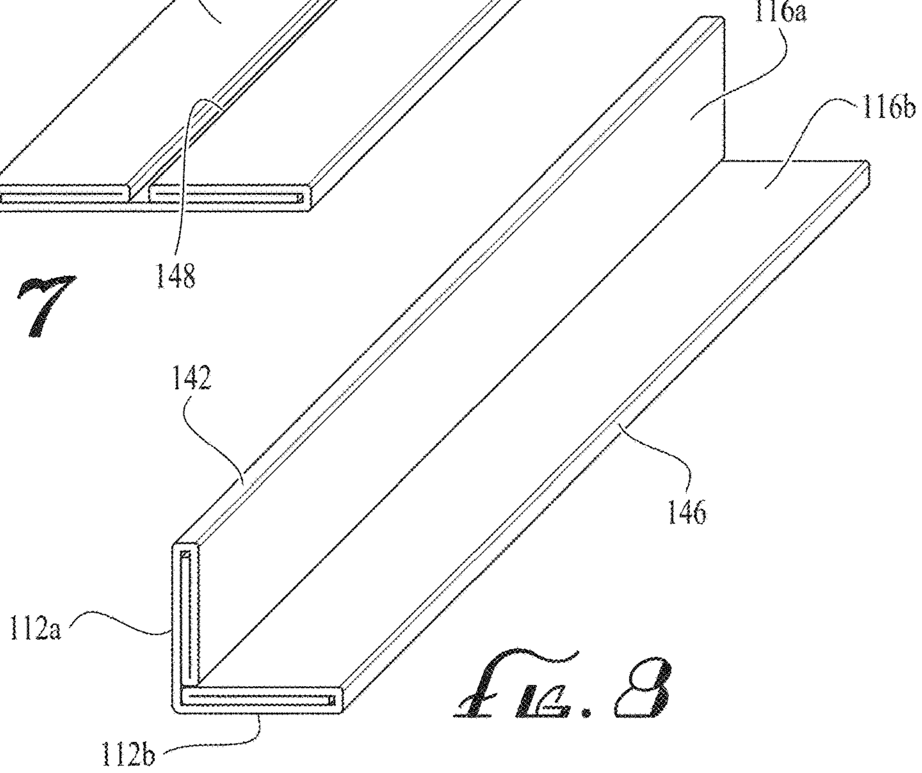
FIG. 8 is a close up view the end portion of FIG. 7, wherein the completed shroud of FIG. 1 has been formed.

Next, the blank 110 is folded along the second scoreline 142, causing the first scoreline 140 to move towards the third scoreline 144. This folding causes the folded first scoreline 140 to be in line with (or on top of) the third scoreline 144. Additionally, the blank 110 is folded inward at the fourth scoreline 146, causing the folded fifth scoreline 148 to move towards the third scoreline 144. This folding causes the fifth scoreline 148 to be in line with (or on top of) the third scoreline 144. This is best seen in FIG. 7. At this time, the outer surfaces of middle layers 114*a*, 114*b* can be secured to the inner surfaces of outer layers 112*a*, 112*b* for example, with adhesive or other fastener 115.

And finally, the blank 110 can be folded at the third scoreline 144 such that the first side 102 and second side 104 create a corner. As best seen in FIG. 2, third scoreline 144/corner line 106 can be in the form a longitudinal recess that extends along the blank 110 from first edge 130 to second edge 132. This recess 135 allows the first side 102 to rotate/fold along corner line 106 to a substantially perpendicular position relative to the second side 104.

Referring now to FIGS. 9 through 20, a second embodiment of the present invention is shown, which is directed to a combination of a corner shroud 200 having a least one integrated side wall 201.

Figure 10:
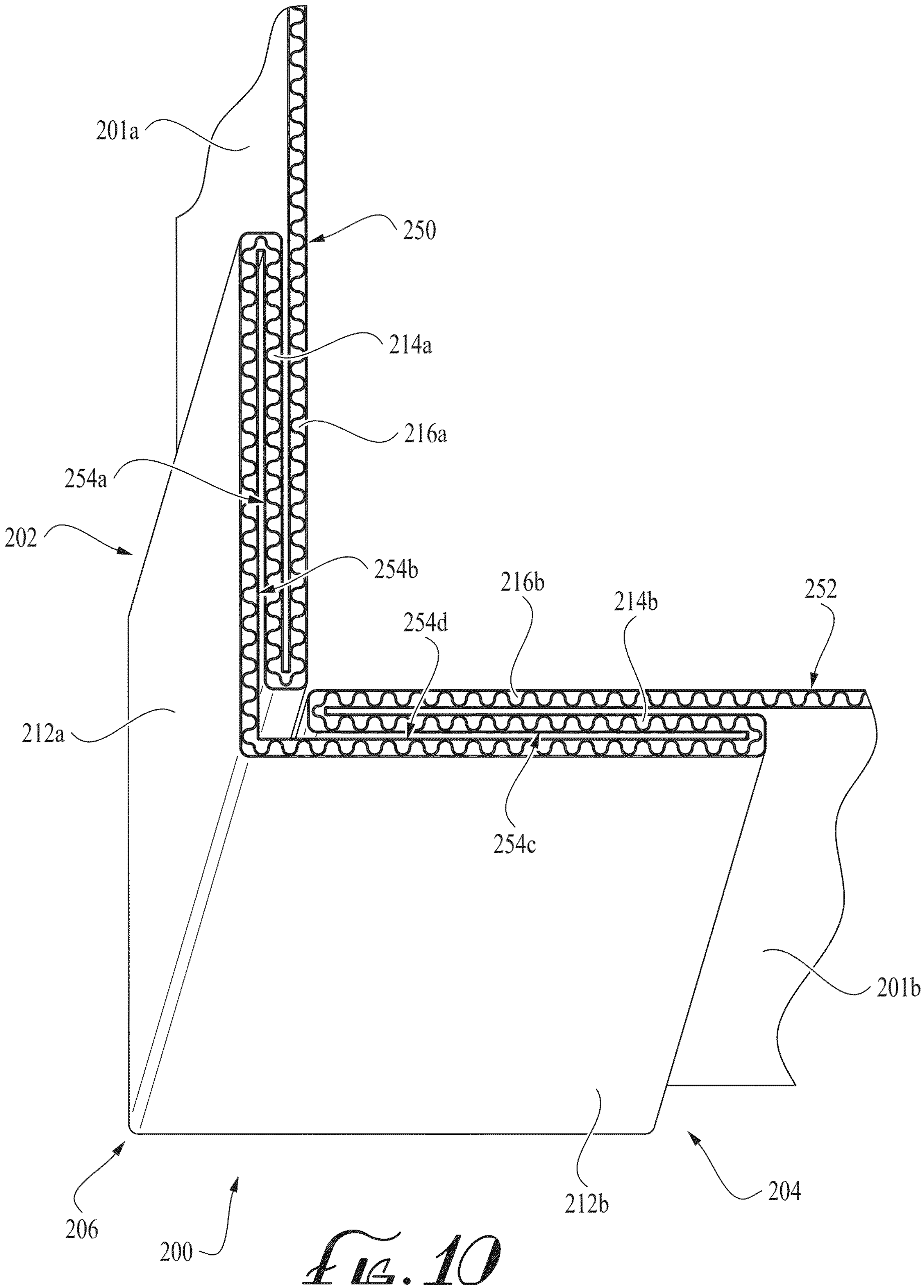
FIG. 10 is a close-up top view of a corner of the combination shown in FIG. 9.
Figure 12:
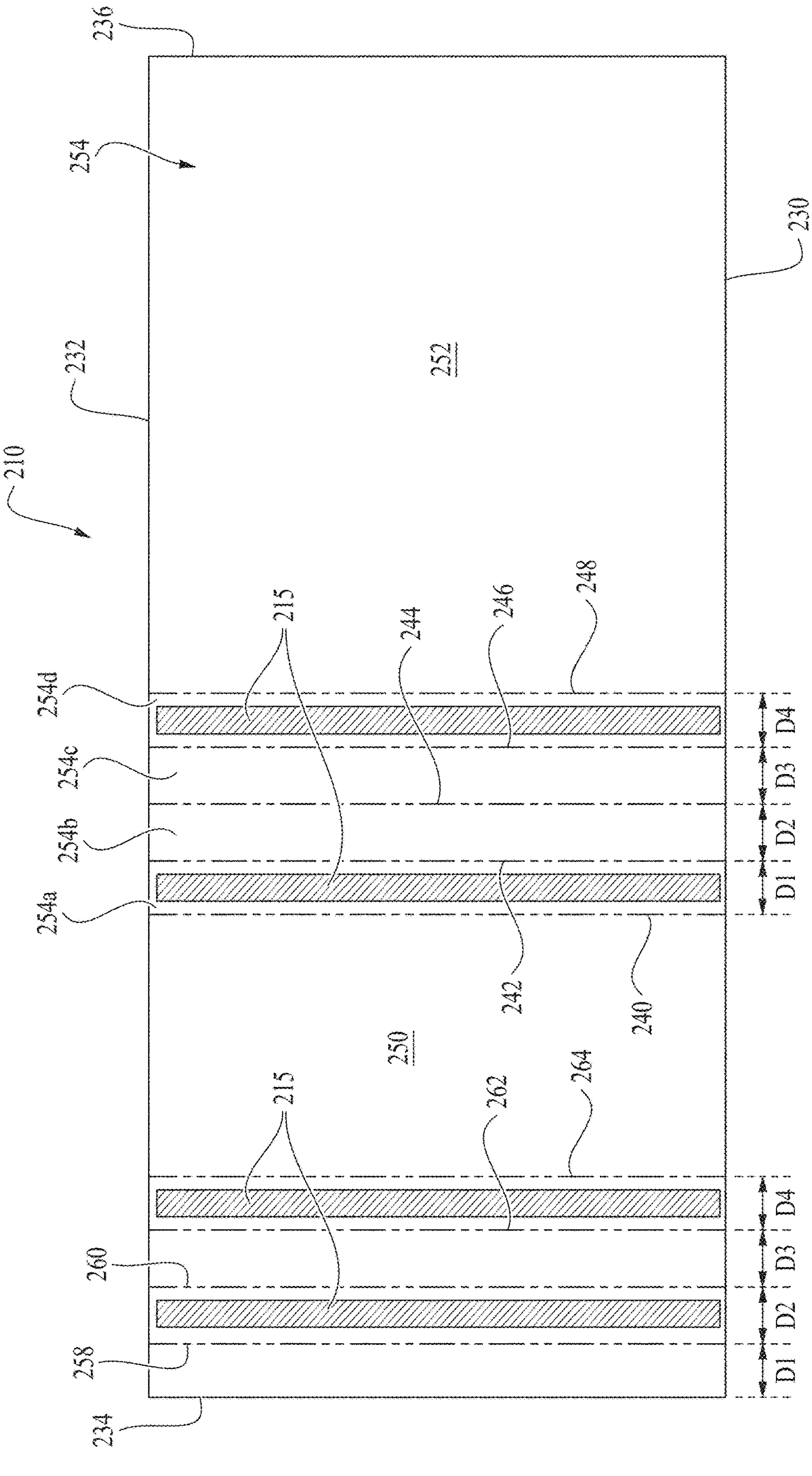
FIG. 12 is a top plan view of an inner surface of a blank used to create the combination of FIG. 9.

With reference to FIG. 10, the corner shroud 200 is a three-layer corner piece comprising a first side 202, which is made up of three layers, joined together with a second side 204, which is made up of three layers. The first side 202 and second side 204 are operatively connected together at a corner line 206. At the corner line 206, the first side 202 and the second side 204 are bent towards each other to form the corner shroud 200. In the preferred embodiment, the corner shroud 200 is a single, integral piece. Therefore, although multiple pieces can be used, in the preferred embodiment, the corner shroud 200 is made from a single blank 210 (as shown in FIG. 12) that is folded in a specific manner as described below.

In the preferred embodiment, the first side 202 comprises three layers: an outer layer 212*a*, a middle layer 214*a* adjacent to the outer layer 212*a*, and an inner layer 216*a* adjacent to the middle layer 214*a* opposite the outer layer 212*a*. The second side 204 also comprises three layers: an outer layer 212*b*, a middle layer 214*b* adjacent to the outer layer 212*b*, and in inner layer 216*b* adjacent to the middle layer 214*b* opposite the outer layer 212*b*. In the preferred embodiment, the middle layers 214*a*, 214*b* are fastened to their respective outer layers 212*a*, 212*b*, and the inner layers 216*a*, 216*b* can remain unfastened as loose flaps. In some embodiments, the inner layers 216*a*, 216*b* can be fastened to their respective middle layers 214*a*, 214*b*. In some embodiments, the middle layers 214*a*, 214*b* are not fastened to their respective outer layers 212*a*, 212*b*. In embodiments in which the layers are fastened, fastening can be done with typical fasteners in the industry, such as glue, tape, staples, and the like.

Figure 9:
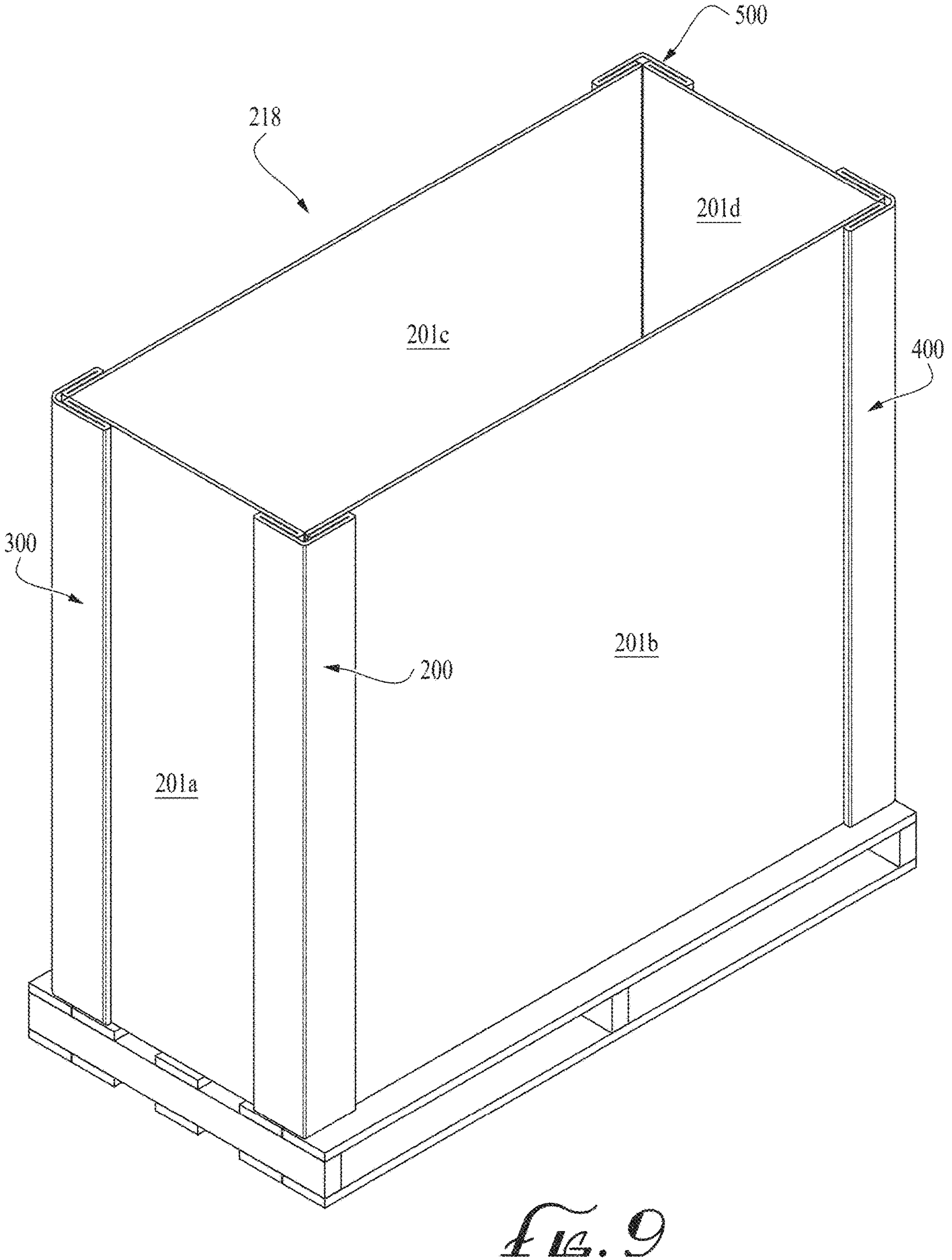
FIG. 9 is a perspective view of a corner shroud and an integrated side wall having features of the present invention, wherein two
Figure 11:
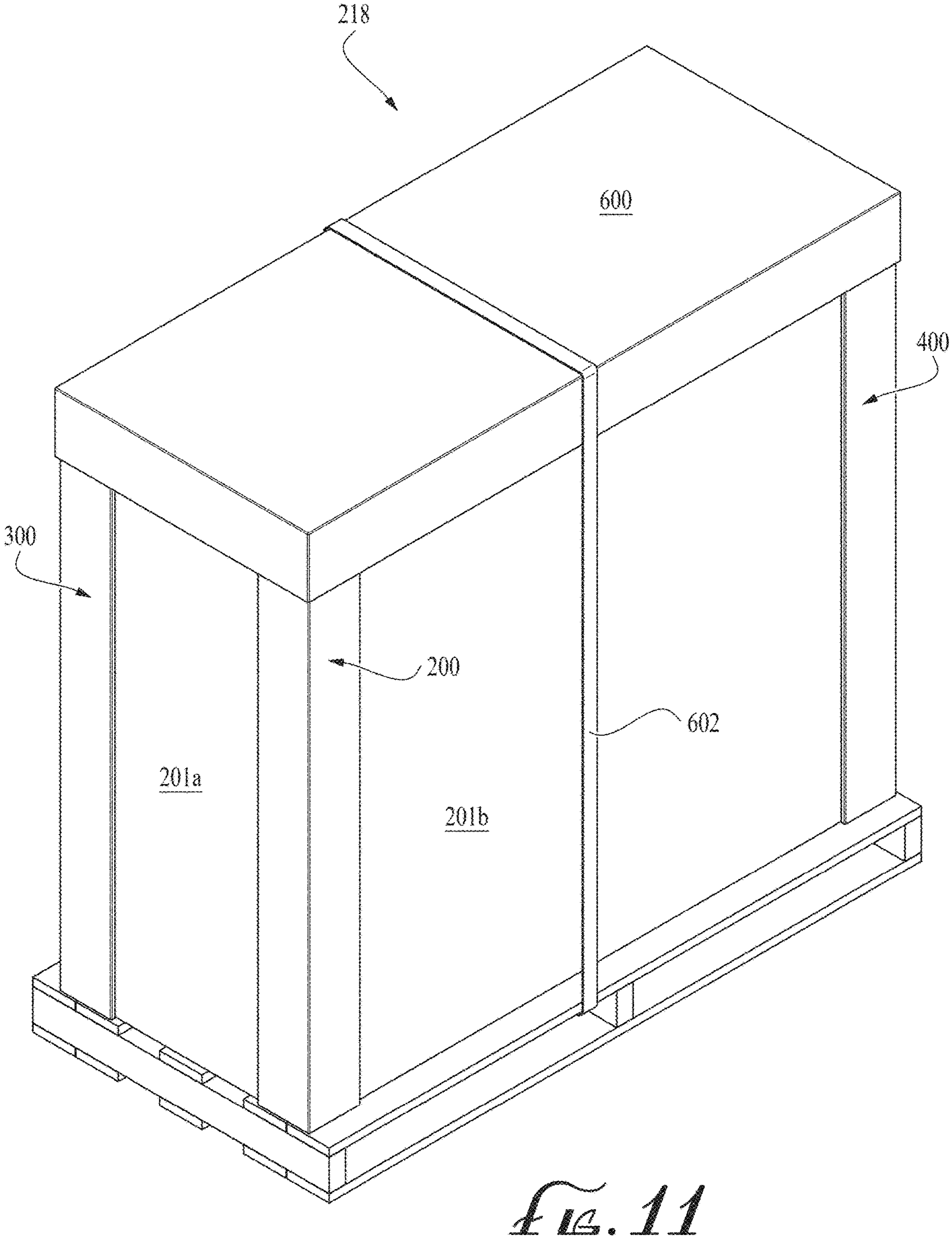
FIG. 11 is a perspective view of the combination of FIG. 9, wherein the combination further includes a lid.

In some embodiments, the inner layers 216*a*, 216*b* of the first side 202 and/or the second side 204 can be extended beyond the boundaries of the outer layers 212*a*, 212*b* thereby forming a wall 201 of a box 218. By way of example only, the inner layer 216*a* of the first side 202 can extend beyond the outer layer 212*a* of the first side to form a first wall 201*a* of the box 218. Similarly, the inner layer 216*b* of the second side 204 can extend beyond the outer layer 212*b* of the second side 204 to form a second wall 201*b* of the box 218. The first wall 201*a* can extend to and terminate at a second corner shroud 300 that has essentially the same features as the first corner shroud 200 described above. The second wall 201*b* can extend to and terminate at a third corner shroud 400 that has essentially the same features as the first corner shroud 200 described above. A third wall 201*c* can extend in between the second corner shroud 300 and the third corner shroud 400 to form a box 218 that is triangular in shape (cross-section) (not shown). This process can be repeated with a fourth corner shroud 500 to form a box 218 that is rectangular in shape as shown in FIGS. 9 and 11. Additional corner shrouds can be added with extensions of the inner layer to form boxes of various shapes, such as a pentagon, hexagon, heptagon, octagon, and so on.

In some embodiments, the box 218 can be a one-piece box created from a single blank 210. In some embodiments, the box 218 can be made from multiple pieces. By way of example only, a two-piece box 218 can be made from two identical blanks 210 folded according to the teachings in the present invention.

Once the box 218 is fully assembled, a lid 600 can be added to close the open top as shown in FIG. 11. Additional binders 602 can be used to further secure the box 218, such as tape, plastic bands, plastic wraps, and the like.

Figure 13:
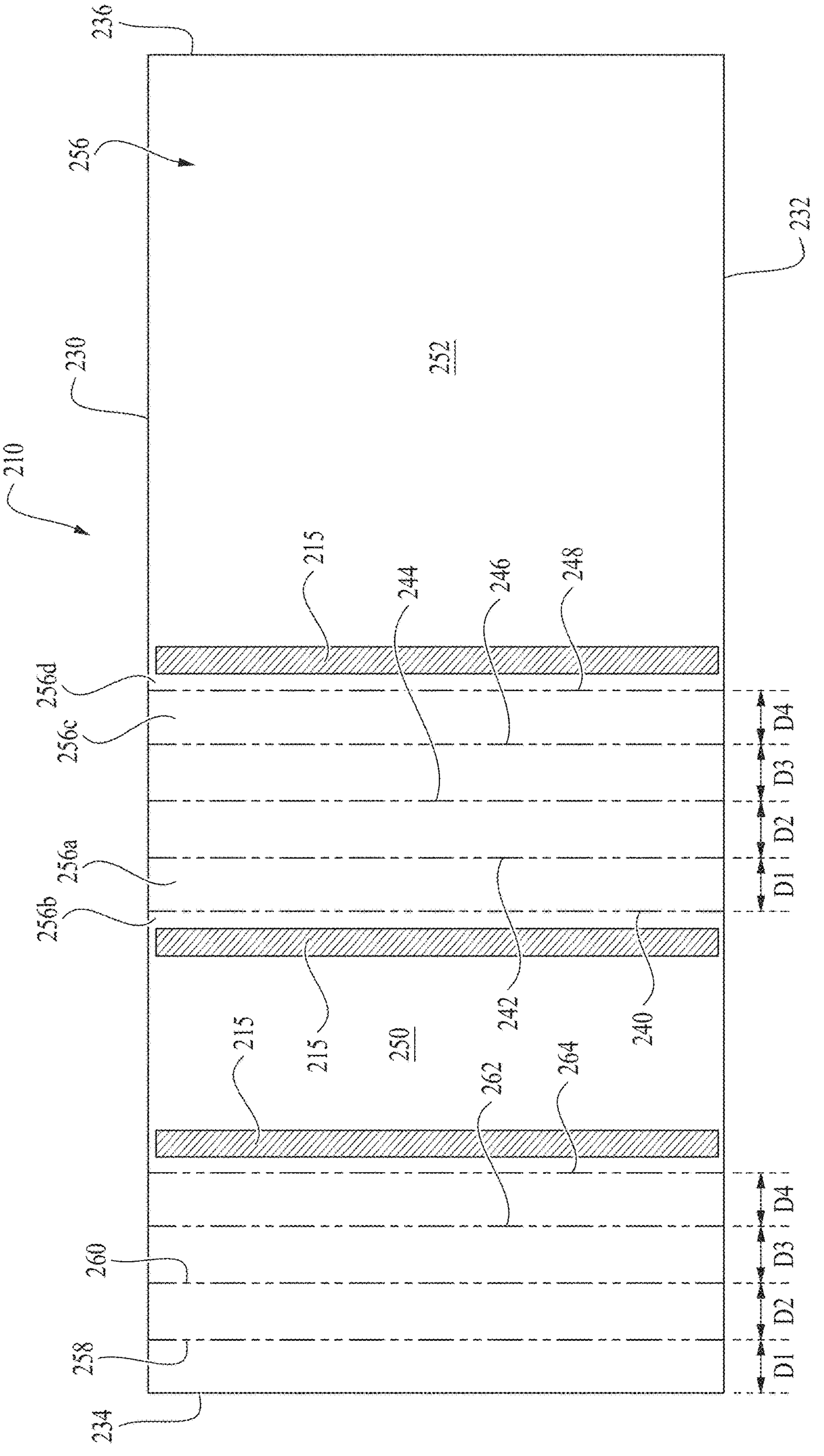
FIG. 13 is a top plan view of an outer surface of the blank of FIG. 12.

Referring now to FIGS. 12 and 13, the blank 210 is a flat, rectangular piece of material. Preferably, the material is corrugated paperboard, but other material can also be used. The blank 210 has a first edge 230, a second edge 232 opposite the first edge 230, a third edge 234 adjacent to the first edge 230 and the second edge 232, and a fourth edge 236 opposite the third edge 234 and adjacent to the first edge 230 and the second edge 232, an outer surface 256 bound by the four edges, and an inner surface 254 opposite the outer surface and bound by the four edges. A plurality of score-lines can be created in the blank 210 in the direction of the first edge 230 to the second edge 232 to facilitate the folding steps for manufacturing the corner shroud 200 and wall 201 combination.

In the preferred embodiment, the blank 210 comprises a first series of five scorelines each extending in the direction of the first edge 230 and the second edge 232. Preferably, the scorelines extend the full length of the blank 210 from the first edge 230 to the second edge 232. The scorelines run parallel to each other and are spaced apart from each other by a distance in the direction of the third edge 234 and fourth edge 236. For ease of description, the following ordinal numbers are used to one scoreline from another, but the ordinal numbers are not limiting. The first scoreline 240 is the scoreline closest to the third edge 234. The second scoreline 242 is the scoreline immediately adjacent to the first scoreline 240 moving in the direction of the fourth edge 236. The third scoreline 244 is the scoreline immediately adjacent to the second scoreline 242 continuing to move in the direction of the fourth edge 236. The fourth scoreline 246 is the scoreline immediately adjacent to the third scoreline 244 continuing to move in the direction of the fourth edge 236. The fifth scoreline 248 is the scoreline immediately adjacent to the fourth scoreline 246 continuing to move in the direction of the fourth edge 236. With this configuration, the third scoreline 244 is the middle scoreline, and when properly folded becomes the corner line 206 of the corner shroud 200.

There can be a portion of the blank 210 extending away from the first scoreline 240 in the direction of the third edge 234. This portion of the blank 210 is referred to as the first flap 250. When the blank 210 is formed into the box 218, the first flap 250 becomes one of the walls of the box 218, for example, the first wall 201*a*. In some embodiments, a second portion of the blank 210 can extend away from the fifth scoreline 248 in the direction of the fourth edge 236. This portion of the blank 210 is referred to as the second flap 252. When the blank 210 is formed into the box 218, the second flap 252 can become a second wall 201*b*. As such, the distance from the first scoreline 240 to the third edge 234 can be sufficient to function as a wall of a box 218. Similarly, the distance from the fifth scoreline 248 to the fourth edge 236 can be sufficient to function as a wall of a box 218.

However, in some embodiments, the blank 210 may not have a first flap 250 and/or a second flap 252. In such an embodiment, only the corner shroud 200 is formed without any walls. In some embodiments, the corner shroud 200 may have one or two flaps to define one to two walls. In such embodiments, any box 218 formed may be a multi-piece box as opposed to a single, integrally formed piece. In embodiments in which only the corner shroud 200 is formed, flat corrugated paperboard material can be inserted in between corner shrouds to create walls.

In the preferred embodiment, the first distance D1 between the first scoreline 240 and the second scoreline 242 is less than the second distance D2 between the second scoreline 242 and the third scoreline 244. In addition, the second distance D2 can be equal to the third distance D3 between the third scoreline 244 and the fourth scoreline 246. Also, the third distance D3 can be greater than the fourth distance D4 between the fourth scoreline 246 and the fifth scoreline 248. Furthermore, the fourth distance D4 can be equal to the first distance D1. In some embodiments, all four distances D1-D4 can be equal to each other.

Optionally, the blank 210 can comprise a second series of scorelines 258, 260, 262, 264 that extend along the first flap 250, proximate the third edge 234, in order to form the second corner shroud 300. The same D1-D4 from scorelines 240-248 apply to the panels formed by scorelines 258-264 so that corner shroud 300 has the same dimensions as corner shroud 200.

Optionally, there can be third series of scorelines (comprising at least one scoreline) along second flap 252, proximate fourth edge 236.

Figure 14:
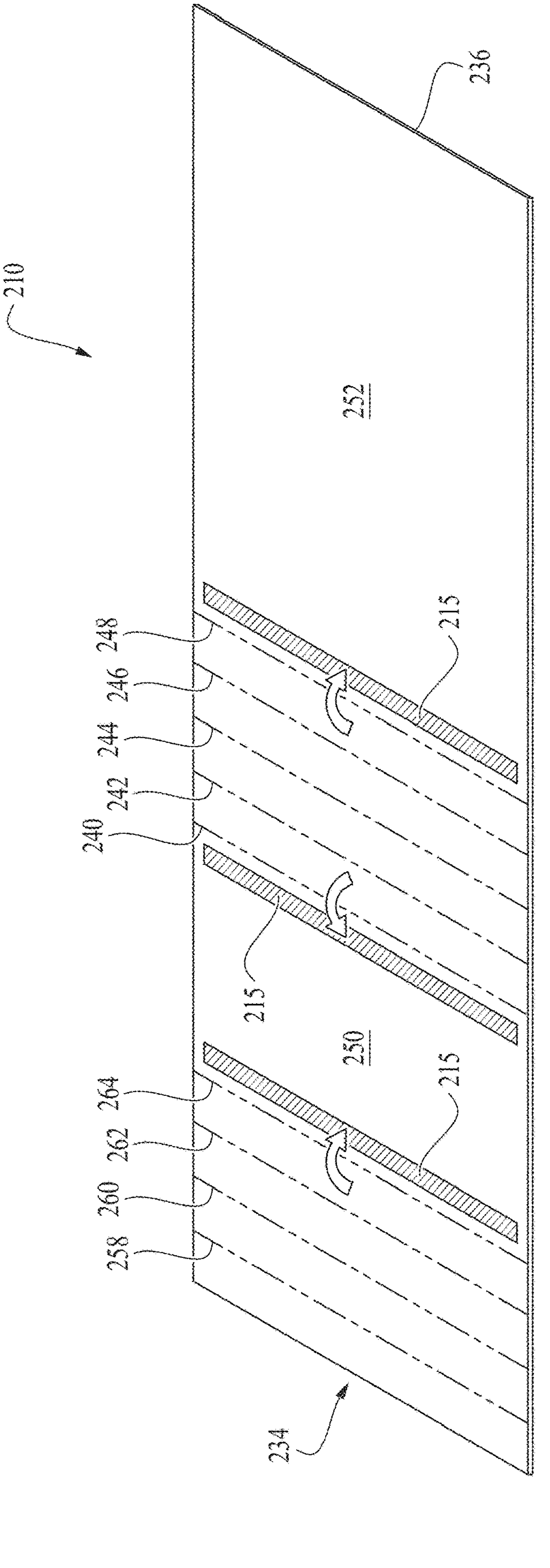
FIG. 14 is a perspective view of a first step of folding the blank of FIG. 13, wherein the outer surface of the blank is shown.
Figure 15:
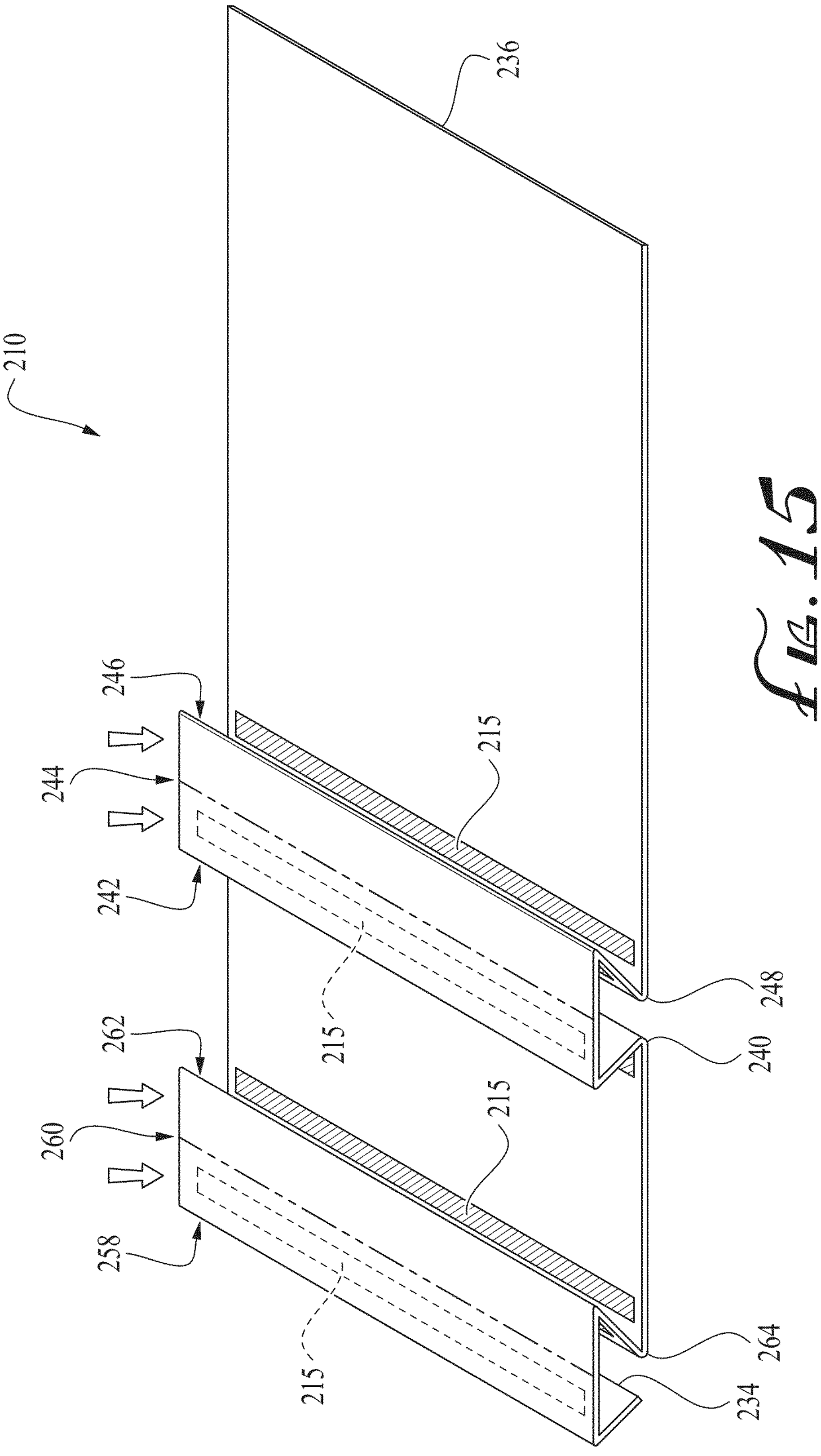
FIG. 15 is a perspective view of a second step of folding the blank of FIG. 13.
Figure 16:
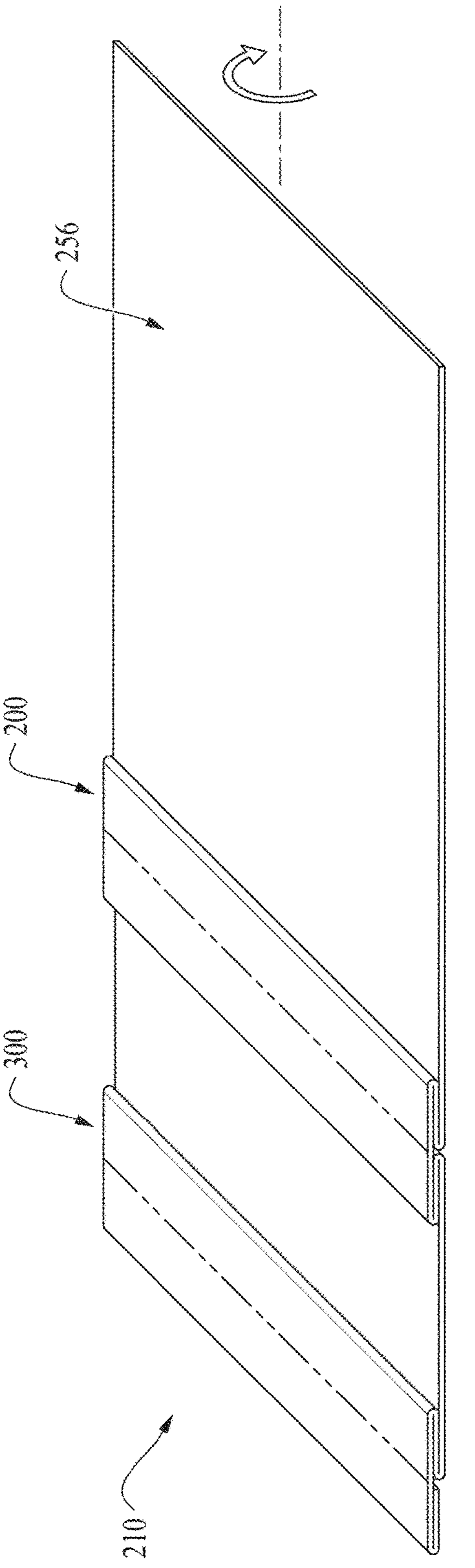
FIG. 16 is a perspective view of a third step of folding the blank of FIG. 13.

To form the corner shroud 200 from the blank 210, the following steps are taken without being limited by any sequence of steps. If the blank 210 is laid on the ground the outer surface 256 can be faced up and the inner surface 254 can be placed on the ground. The blank 210 is folded outwards, along the first and the fifth scorelines 240, 248, and along the second and fourth scorelines 242 246, such that the second scoreline 242 extends beyond the first scoreline 240 and is positioned closer to third edge 234 than the first scoreline 240, and the fourth scoreline 246 extends beyond the fifth scoreline 248 and is positioned closer to the fourth edge 236 than the fifth scoreline 248. Additionally, if the second series of scorelines 258-264 are included, the blank 210 is also folded along scorelines 258, 263 and 264 to form the third corner shroud 300. This can best be seen in FIGS. 14 and 15, and FIG. 16 shows the final, partially folded corner shrouds 200, 300. Adhesive or other fastener can be used 215 to securely form the shrouds 200, 300.

Figure 17:
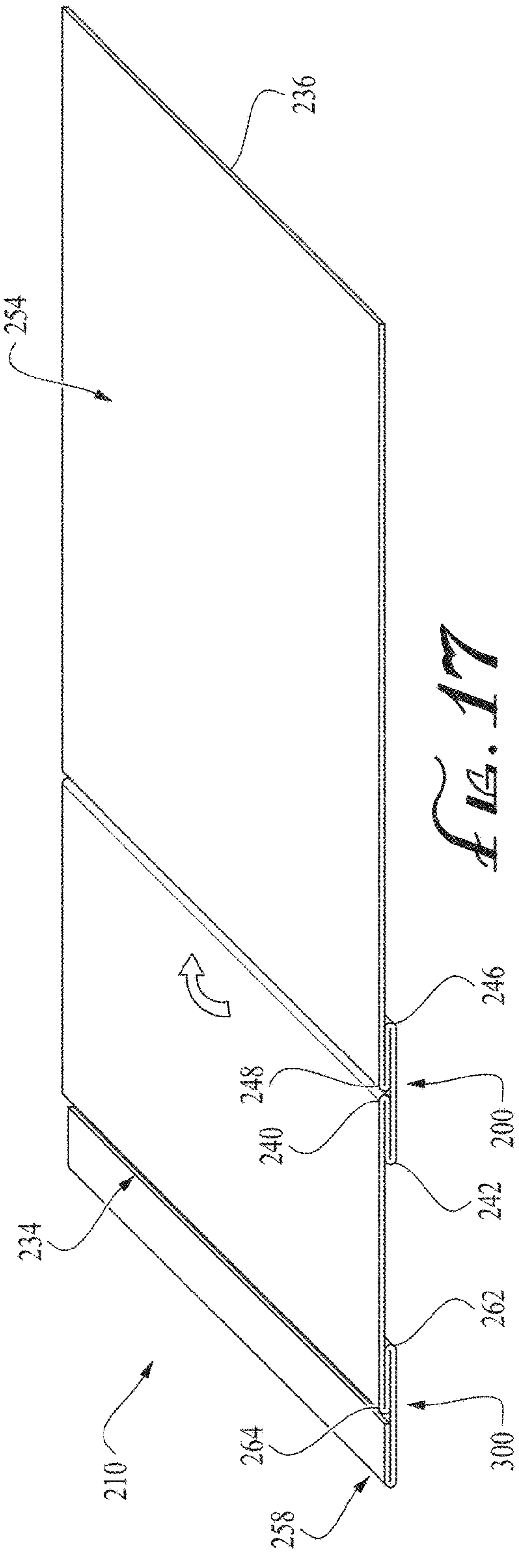
FIG. 17 is a perspective view of a fourth step of folding the blank of FIG. 13.

Optionally, the blank 210 can be folded from the other direction, such that the blank 210 is laid on the ground the inner surface 255 can be faced up and the outer surface 256 can be placed on the ground. This folding pattern can be best understood when FIG. 17 is viewed.

The blank 210 is folded inward at the second scoreline 242 causing the first scoreline 240 to move towards the third scoreline 244. This folding causes the first scoreline 240 to be in line with (or on top of) the third scoreline 244, and a first inner surface portion 254*a* in between the first scoreline 240 and the second scoreline 242 can be placed surface-to-surface adjacent to a second inner surface portion 254*b* in between the second scoreline 242 and the third scoreline 244. These first inner surface portion 254*a* and the second inner surface portion 254*b* can be fastened together, for example, with adhesive or other fastener 215. The blank 210 can be folded at the first scoreline 240 in a direction away from the fifth scoreline 248. This causes a first outer surface portion 256*a* between the first scoreline 240 and the second scoreline 242 to be placed surface-to-surface adjacent to a second outer surface portion 256*b* lateral to the first scoreline 240 away from the third scoreline 244 (i.e. the outer surface of the first flap 250). The first outer surface portion 256*a* can be fastened to the second outer surface portion 256*b* using adhesive 215, or left unfastened.

A similar process can be performed on the opposite side with the blank 210 being folded inward at the fourth scoreline 246 causing the fifth scoreline 248 to move towards the third scoreline 244. This folding causes the fifth scoreline 248 to be in line with (or on top of) the third scoreline 244, and directly adjacent to the first scoreline 240. In addition, a third inner surface portion 254*c* in between the third scoreline 244 and the fourth scoreline 246 can be placed surface-to-surface with a fourth inner surface portion 254*d* in between the fourth scoreline 246 and the fifth scoreline 248. These third inner surface portion 254*c* and the fourth inner surface portion 254*d* can be fastened together, for example, with adhesive or other fastener 215. The blank 210 can be folded at the fifth scoreline 248 in a direction away from the first scoreline 240. This causes a third outer surface portion 256*c* between the fourth scoreline 246 and the fifth scoreline 248 to be placed surface-to-surface adjacent to a fourth outer surface portion 256*d* lateral to the fifth scoreline 248 away from the third scoreline 244 (i.e., the outer surface of the second flap 252). The third outer surface portion 256*c* can be fastened to the fourth outer surface portion 256*d* with adhesive 215, or left unfastened.

Figure 18:
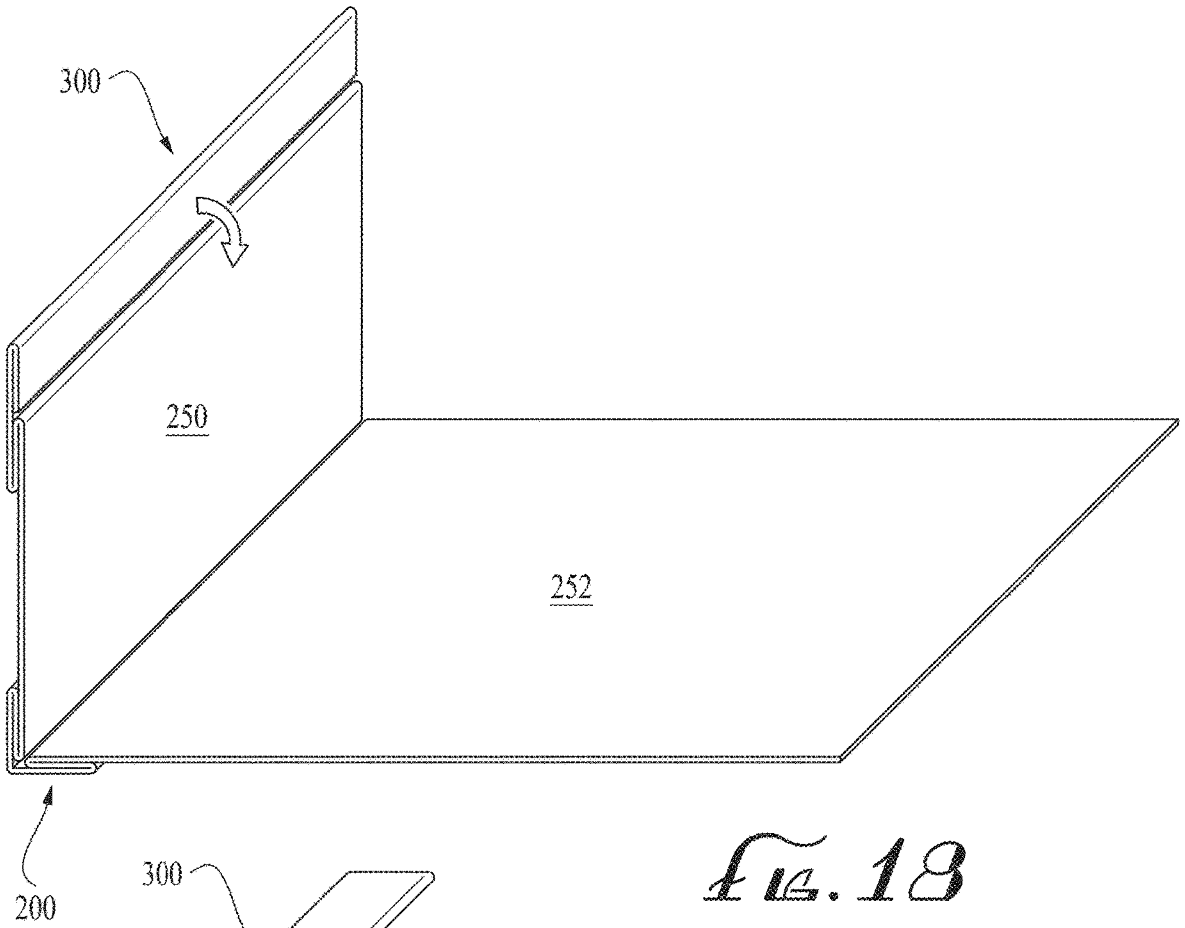
FIG. 18 is a perspective view of a fifth step of folding the blank of FIG. 13.
Figure 19:
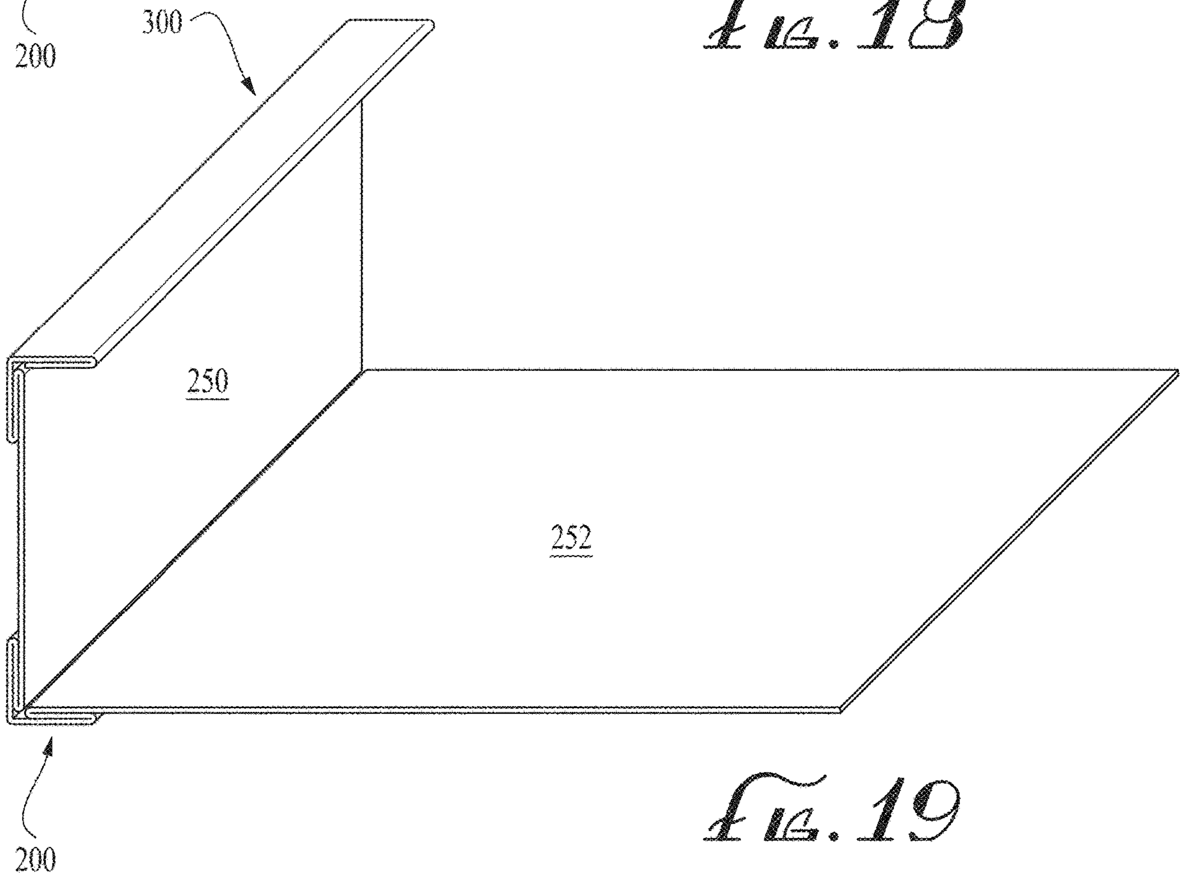
FIG. 19 is a perspective view of the folded blank of FIG. 13, wherein the combination of FIG. 9 has been formed.

Referring now to FIGS. 18 and 19, the blank 210 can be folded at the third scoreline 244 such that a fifth inner surface portion at the first flap 250 is brought closer towards a sixth inner surface portion at the second flap 252 to create a corner. In this configuration, which is best seen in FIG. 10, the portion of the blank 210 that makes up the first inner surface portion 254*a*, the second inner surface portion 254*b*, and the first flap 250 (i.e. the fifth inner surface portion) create three layers on the first side 202 of the corner shroud 200. Similarly, the portion of the blank 210 that makes up the third inner surface portion 254*c*, the fourth inner surface portion 254*d*, and the second flap 252 (i.e. the sixth inner surface portion) create three layers on the second side 202 of the corner shroud 200.

For typical box shaped items, this process can be repeated for a second corner shroud 300 (using the second series of scorelines 258-264), a third corner shroud 400, and a fourth corner shroud 500. Binding, such as plastic wrap can then be wrapped around all four corner shrouds and the item for a protected package. In some embodiments, the first flap 250 of a first corner shroud 200 can extend towards a second corner shroud 300 to create a first wall 201*b*. The second flap 250 of the first corner shroud 200 can extend towards a third corner shroud 400 to create a second wall 201*a*. The same can occur with the other corner shrouds until all sides of the item are covered by a wall.

Figure 20:
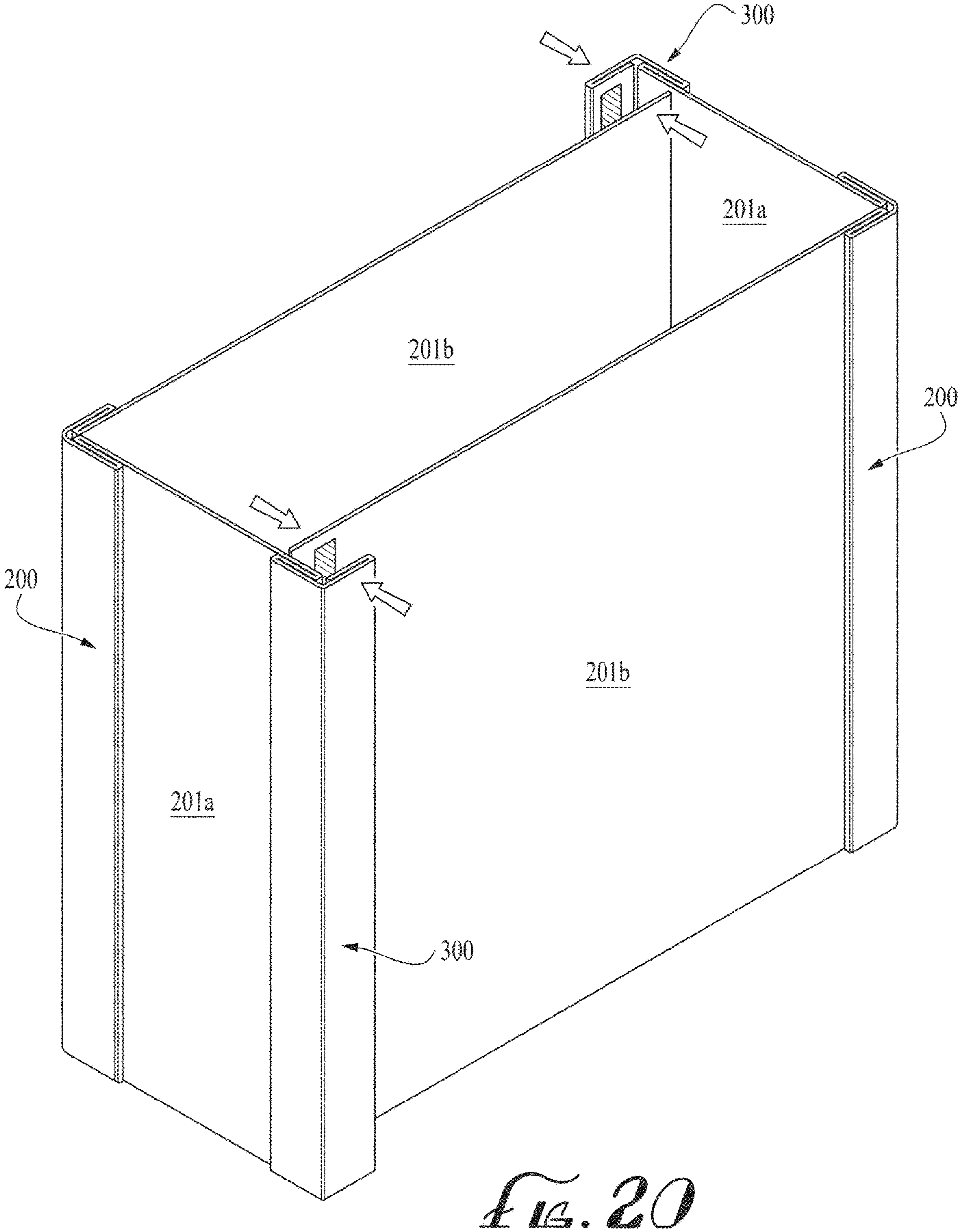
FIG. 20 is a perspective view of the combination of FIG. 9, wherein two combinations are coupled together to form a box.

Referring now to FIG. 20, it can be seen that two shrouds 200/wall 201 combinations can be used to create a two-piece box 218 with four corner shrouds Based on this disclosure, many other variations have been contemplated. For example, in some embodiments, the first or second set/series of scorelines may only use 4 scorelines and not have a flap 250 because the flap from an adjacent corner shroud can be used as the wall. In some embodiments, one or both of the first edge 230 and/or second edge 232 can have a cutout.

The present invention has many advantages including that it is recyclable and costs less to manufacture than standard V-boards. Moreover, due to the three-layer configuration, the corner shroud of the present invention has the strength to withstand significant loads of weight, making it a desirable option when compared to standard V-boards that are currently on the market.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A first corrugated paperboard corner shroud consisting of:

a) a first side portion having:
   i) an outer layer;
   an inner layer fastened to the first side portion outer layer;
   iii) a proximal edge; and
   iv) a distal edge;
b) a second side portion having:
   i) an outer layer;
   ii) an inner layer;
   iii) a middle layer fastened to the second side outer layer and the second side inner layer;
   iv) a proximal edge; and
   v) a distal edge;

wherein the proximal edge of the first side portion and the distal edge of the second side portion are foldably coupled together; and wherein the second side portion inner layer forms a first flap extending from the proximal edge of the second side portion, beyond the second side portions middle layer and outer layer, to form a first wall panel of a box, wherein at least a portion of the first wall panel does not overlap with the middle layer and outer layer of the second side portion of the first corner shroud.

2. A first corrugated paperboard corner shroud consisting of:

a) a first side portion having:
   i) an outer layer;
   ii) an inner layer fastened to the first side portion outer layer;

iii) a proximal edge; and
iv) a distal edge;
b) a second side portion having:
i) an outer layer;
ii) an inner layer;
iii) a middle layer fastened to the second side outer layer and the second side inner layer;
iv) a proximal edge; and
v) a distal edge;

wherein the proximal edge of the first side portion and the distal edge of the second side portion are foldably coupled together; and wherein the second side portion inner layer forms a first flap extending from the proximal edge of the second side portion, beyond the second side portions middle layer and outer layer, to form a first wall panel of a box, wherein at least a portion of the first wall panel does not overlap with the middle layer and outer layer of the second side portion of the first corner shroud, wherein the first side portion further comprises a middle layer fastened to the first side outer layer and the first side inner layer, and the first side inner layer forms a second flap extending from the distal edge of the first side portion, beyond the first side portions middle layer and outer layer, to form a second wall panel of the box, wherein at least a portion of the second wall panel does not overlap with the middle layer and outer layer of the first side portion of the first corner shroud.

3. A box having at least one corner shroud consisting of:
a) a first side portion having:
i) an outer layer;
ii) an inner layer fastened to the first side portion outer layer;
iii) a proximal edge; and
iv) a distal edge;
b) a second side portion having:
i) an outer layer;
ii) an inner layer;
iii) a middle layer fastened to the second side outer layer and the second side inner layer;
iv) a proximal edge; and
v) a distal edge;

wherein the proximal edge of the first side portion and the distal edge of the second side portion are foldably coupled together; and wherein the second side portion inner layer forms a first flap extending from the proximal edge of the second side portion, beyond the second side portions middle layer and outer layer, to form a first wall panel of a box, wherein at least a portion of the first wall panel does not overlap with the middle layer and outer layer of the second side portion of the first corner shroud.

4. A box having at least one corner shroud consisting of:
a) a first side portion having:
i) an outer layer;
ii) an inner layer fastened to the first side portion outer layer;
iii) a proximal edge; and
iv) a distal edge;
b) a second side portion having:
i) an outer layer;
ii) an inner layer;
iii) a middle layer fastened to the second side outer layer and the second side inner layer;
iv) a proximal edge; and
v) a distal edge;

wherein the proximal edge of the first side portion and the distal edge of the second side portion are foldably coupled together; and wherein the second side portion inner layer forms a first flap extending from the proximal edge of the second side portion, beyond the second side portions middle layer and outer layer, to form a first wall panel of a box, wherein at least a portion of the first wall panel does not overlap with the middle layer and outer layer of the second side portion of the first corner shroud, wherein the first side portion further comprises a middle layer fastened to the first side outer layer and the first side inner layer, and the first side inner layer forms a second flap extending from the distal edge of the first side portion, beyond the first side portions middle layer and outer layer, to form a second wall panel of the box, wherein at least a portion of the second wall panel does not overlap with the middle layer and outer layer of the first side portion of the first corner shroud.

5. A blank for forming a corner shroud, the blank consisting of a flat, rectangular piece of corrugated paperboard consisting of:
a) a first edge;
b) a second edge, wherein the second edge is disposed opposite the first edge;
c) a third edge;
d) a fourth edge, wherein the fourth edge is disposed opposite the third edge;
e) an inner surface;
f) an outer surface;
g) a first panel extending from the first edge to the second edge, between the third edge and a sixth scoreline;
h) a second panel foldably coupled to the first panel along the sixth scoreline, the second panel extending from the first edge to the second edge, between the sixth scoreline and a seventh scoreline;
i) a third panel foldably coupled to the second panel along the seventh scoreline, the third panel extending from the first edge to the second edge, between the seventh scoreline and an eighth scoreline;
j) a fourth panel foldably coupled to the third panel along the eighth scoreline, the fourth panel extending from the first edge to the second edge, between the eighth scoreline and a ninth scoreline;
k) a fifth panel foldably coupled to the first wall panel along a first scoreline, the fifth panel extending from the first edge to the second edge, between the first scoreline and a second scoreline;
l) A sixth panel foldably coupled to the fifth panel along the second scoreline, the sixth panel extending from the first edge to the second edge, between the second scoreline and a third scoreline;
m) a seventh panel foldably coupled to the sixth panel along the third scoreline, the seventh panel extending from the first edge to the second edge, between the third scoreline and a fourth scoreline;
n) an eighth panel foldably coupled to the seventh panel along the fourth scoreline, the eighth panel extending from the first edge to the second edge, between the fourth scoreline and a fifth scoreline;
o) a first wall panel foldably coupled to the fourth panel along the ninth scoreline, the first wall panel extending from the first edge to the second edge; and
p) a second wall panel foldably coupled to the eighth panel along the fifth scoreline, the second wall panel extending from the first edge to the second edge, between the fifth scoreline and the fourth edge.

6. A corner shroud system consisting of:
a) a first corner shroud comprising:
i) a first side portion having:
(1) an outer layer;
(2) an inner layer fastened to the first side portion outer layer of the first corner shroud;
(3) a proximal edge; and
(4) a distal edge;
ii) a second side portion having:
(1) an outer layer;
(2) an inner layer;
(3) a middle layer fastened to the second side outer layer and the second side inner layer of the first corner shroud;
(4) a proximal edge; and
(5) a distal edge;
wherein the proximal edge of the first side portion and the distal edge of the second side portion of the first corner shroud are foldably coupled together; and
wherein the second side portion inner layer forms a first flap that extends from the proximal edge of the second side portion, beyond the first corner shrouds second side portions middle layer and outer layer, to form a first wall panel of a box, wherein at least a portion of the first wall panel does not overlap with the middle layer and outer layer of the second side portion of the first corner shroud;
b) a second corner shroud comprising:
i) a first side portion having:
(1) an outer layer;
(2) an inner layer;
(3) a middle layer secured to the first side outer layer and the first side inner layer of the second corner shroud;
(4) a proximal edge; and
(5) a distal edge;
ii) a second side portion-having:
(1) an outer layer;
(2) an inner layer;
(3) a middle layer fastened to the second side outer layer and the second side inner layer of the second corner shroud;
(4) a proximal edge; and
(5) a distal edge;
wherein the proximal edge of the first side portion and the distal edge of the second side portion of the second corner shroud are foldably coupled together;
wherein the first wall panel of the box comprises the first corner shrouds second side portion inner layer and the second corner shrouds first side portion inner layer; and
wherein the second corner shrouds second side portion inner layer forms a second flap that extends from the proximal edge of the second corner shrouds second side portion, beyond the second corner shrouds second side portions middle layer and outer layer, to form a second wall panel of the box, wherein at least a portion of the second wall panel does not overlap with the middle layer and outer layer of the second side portion of the second corner shroud.

* * * * *